United States Patent [19]
Ohmae et al.

[11] Patent Number: 4,562,341
[45] Date of Patent: Dec. 31, 1985

[54] ELECTRONIC CASH REGISTER

[75] Inventors: Kenichi Ohmae, Yokohama; Kazuma Tateisi, Kyoto; Yoshitsugu Shinohara; Masazumi Ichihashi, both of Shiga, all of Japan

[73] Assignee: Omron Tateisi Electronics Co., Kyoto, Japan

[21] Appl. No.: 580,448

[22] Filed: Feb. 15, 1984

[30] Foreign Application Priority Data

Feb. 18, 1983 [JP] Japan .................. 58-26733

[51] Int. Cl.⁴ ............................................. G06F 15/30
[52] U.S. Cl. ...................................... 235/379; 235/380
[58] Field of Search ................. 235/380, 379; 364/405

[56] References Cited
U.S. PATENT DOCUMENTS 4,317,957  3/1982  Sendrow ........................... 235/379
4,319,336  3/1982  Anderson ......................... 235/380

*Primary Examiner*—Harold I. Pitts
*Attorney, Agent, or Firm*—Stevens, Davis, Miller & Mosher

[57] ABSTRACT

An electronic cash register comprising a keyboard having keys for cash registration, a card reader for reading the data recorded in a card, a communication control unit for communicating with a center provided with a customer file having stored therein information as to customers, a device for converting data relating to the credit standing of the customer and forwarded from the center to visible information, a memory for storing data as to cash registration and data as to credit inquiries, and a control unit for processing cash registration, controlling transmission of the data read from the card to the center to be made in response to a communicaiton starting instruction and controlling conversion of the data received from the center to visible information.

13 Claims, 7 Drawing Figures

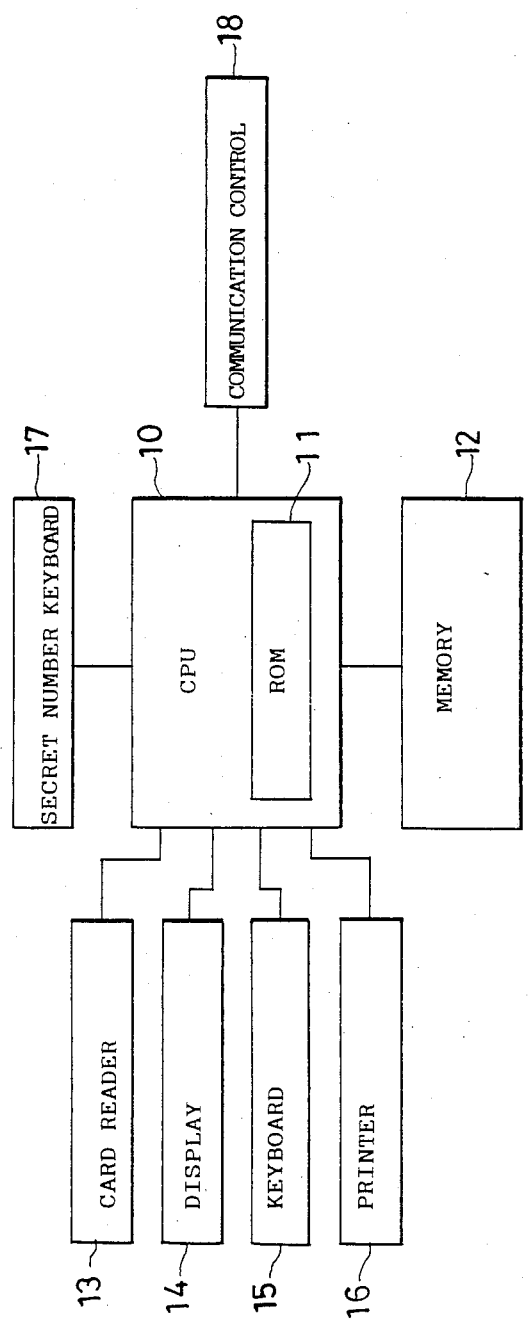
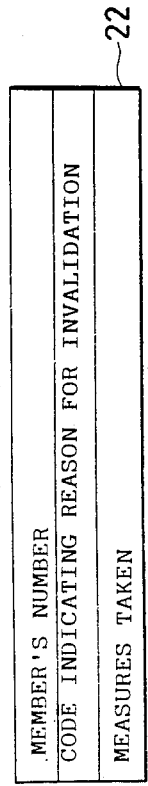

FIG. 5

| |
|---|
| MEMBER'S NUMBER |
| DATE OF APPLICATION FOR MEMBERSHIP |
| DATE OF ISSUE OF CARD |
| MEMBER'S NAME |
| MEMBER'S ADDRESS |
| MEMBER'S TELEPHONE NUMBER |
| MEMBER'S POSTAL CODE |
| MEMBER'S PERMANENT DOMICILE |
| MEMBER'S SEX |
| MEMBER'S AGE |
| MEMBER'S DATE OF BIRTH |
| MEMBER'S EMPLOYER |
| ADDRESS OF MEMBER'S EMPLOYER |
| TELEPHONE NUMBER OF MEMBER'S EMPLOYER |
| MEMBER'S SERVICE SECTION IN EMPLOYMENT |
| MEMBER'S POSITION AS EMPLOYEE |
| KIND OF BUSINESS OF MEMBER'S EMPLOYER |
| CAPITAL OF MEMBER'S EMPLOYER (CLASSIFICATION CODE) |
| MEMBER'S FINANCIAL STANDING |
| MEMBER'S RESIDENCE (CLASSIFICATION CODE) |
| PERIOD OF RESIDENCE OF MEMBER AT PRESENT ADDRESS (CODE) |
| MEMBER'S MARRIED/UNMARRIED CODE |
| MEMBER'S FAMILY MAKEUP (CLASSIFICATION CODE) |
| MEMBER'S ANNUAL INCOME (CLASSIFICATION CODE) |
| PERIOD OF MEMBER'S SERVICE WITH PRESENT EMPLOYER (CODE) |
| MEMBER'S CREDIT STANDING (CODE) |
| NAME OF MEMBERSHIP FAMILY |
| RELATIONSHIP OF MEMBERSHIP FAMILY WITH MEMBER |
| SEX OF MEMBERSHIP FAMILY |
| CREDIT LIMIT |
| NUMBER OF TIMES OF USE OF CARD |

ELECTRONIC CASH REGISTER

BACKGROUND OF THE INVENTION

The present invention relates to an electronic cash register.

Credit cards and bank cards have been introduced into use for the payment of accommodation charges at hotels, motels and like accommodation facilities. At these facilities, the guest bearing such a card is requested to present the card when checking in for the clerk to check the guest for his eligibility and credit. For such checking, the front clerk at the hotel or the like usually makes a telephone call to the credit company or the center of the bank concerned to make inquiries as to the credit standing of the guest and credit limit set for the guest. However, this method of checking by telephone has the drawback of failing to give satisfactory service because the guest bearing the card and other guests are obliged to wait for a long period of time required for the inquiry.

On the other hand, electronic cash registers are placed into use at accommodation facilities for cash registration.

SUMMARY OF THE INVENTION

An object of the present invention is to use an electronic cash register for automatically making inquiries as to the credit standing, credit limit, etc. of guests who use a card so as to assure savings in labor and improved service.

The present invention provides an electronic cash register comprising a keyboard having keys for cash registration, a card reader for reading the data recorded in a card, a communication control unit for communicating with a center provided with a customer file having stored therein information as to customers, a device for converting data relating to the credit standing of the customer and sent from the center to visible information, a memory for storing data as to cash registration and data as to credit inquiries, and a control unit for processing cash registration, controlling transmission of the data read from the card to the center to be made in response to a communication start instruction and controlling conversion of the data received from the center to visible information. Such electronic cash registers include a terminal for a point-of-sales system.

Since the electronic cash register has the function of automatically making inquiries as to the credit customers, it is possible to automatically check the customer for his credit standing including credit troubles in the past and for the credit limit relative to the expected sum of payment. The present invention is especially useful for hotels, motels and like accommodation facilities, eliminating the necessity of keeping the guest waiting for a long period of time, assuring improved service and permitting the hotel clerk to devote himself to the front service other than credit inquiries.

BRIEF DESCRIPTION OF THE DRAWINGS

FIG. 2 is a block diagram showing the construction of the ECR;

FIG. 5 shows part of the contents of a CIF provided at the center of a credit company;

FIG. 6 shows part of the contents of a trouble file at the center; and

DESCRIPTION OF THE PREFERRED EMBODIMENT

Figure 1:
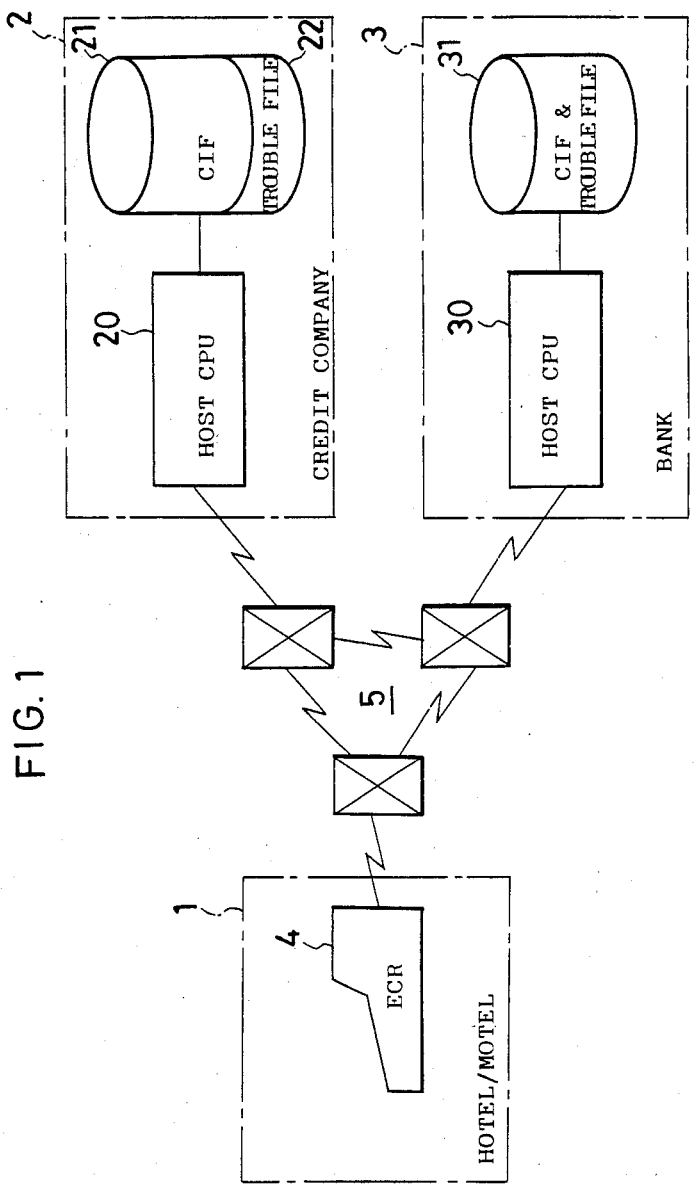
FIG. 1 is an overall block diagram showing a credit inquiry system with use of an electronic cash register (ECR)

FIG. 1 shows the overall construction of a credit transaction system. A hotel or motel 1 is provided with an electronic cash register (ECR) 4. Through a telephone network 5, the ECR 4 is connected to the center 2 of a credit company and/or the center 3 of a bank. Besides these, there may be a credit investigation company having such a center. The center 2 is provided with a host CPU 20 for processing credit inquiries, a customer information file (CIF) 21 and a trouble file 22. Similarly, the center 3 is provided with a host CPU 30, and a CIF and trouble file 31. Although not shown, the centers 2 and 3 are provided with a communication control unit for communications with ECR's 4.

FIG. 2 schematically shows the construction of the ECR 4. The ECR 4 is controlled by a CPU 10 which has a ROM 11 storing a program therefor, and a memory (RAM) 12 for storing data for cash registration processing and data for credit inquiries. The ECR 4, serving as an input-output device under the control of the CPU 10, comprises a card reader 13 for reading the data recorded in cards, a display 14 for showing data as to cash registration and data as to credit inquiries a printer 16 for printing such data, a keyboard 15 for entering instructions for performing these operations and for entering data, and a keyboard 17 for entering a secret number. Preferably the keyboard 17 is connected to the ECR 4 by a cord so as to be operated only by customers. The keyboard 17 need not be provided when the secret number is not checked by the ECR 4 and/or the centers 2, 3 (especially the center 3). The ECR 4 is further provided with a communication control unit 18 for controlling communications with the centers 2 and 3. The unit 18 includes an automatic dial circuit, modem, etc.

The cards to be used for the ECR 4 include, for example, credit cards and bank cards. The credit card, which is issued from the credit company to a member thereof, has recorded therein the member's number, the code of the credit company, etc. The bank card, which is issued from the bank to a person having an account at the bank, can be used for making payments like the credit card. The bank card has recorded therein the account number, bank code, branch code, secret number, etc.

Figure 3:
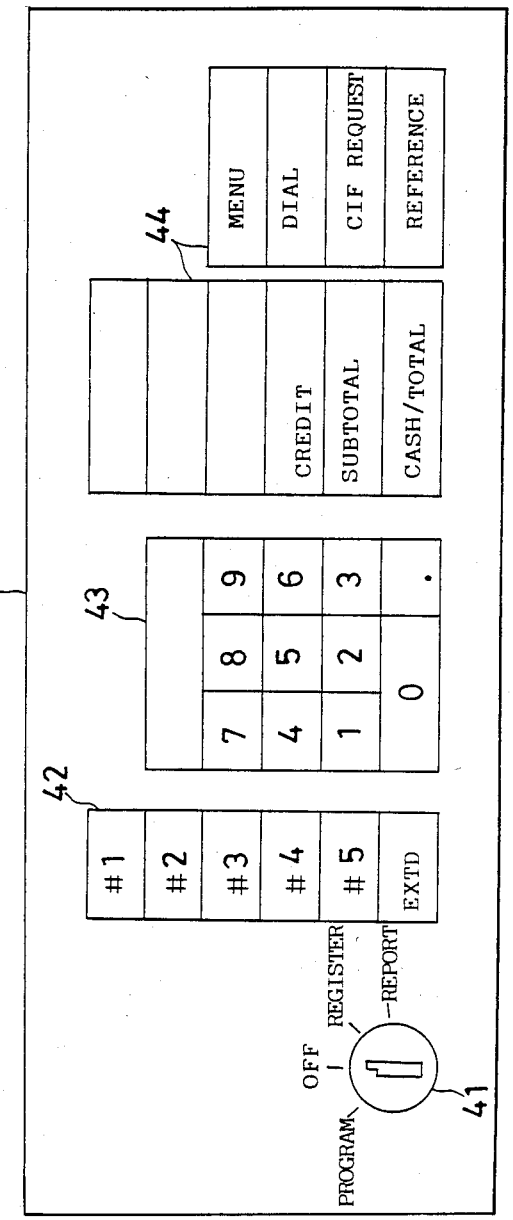
FIG. 3 shows the keyboard of the ECR.

FIG. 3 shows the keyboard 15 of the ECR 4 for illustrative purposes. The keyboard 15 has a mode switch 41, center specifying keys 42, numerical keys 43 and function keys 44. As is generally well known with ECR's, the mode switch 41 is used for selecting the operation mode of the ECR 4. The center specifying keys 42 represent the shortened dial numbers of centers. The function keys 44 include a "DIAL" key, "CIF REQUEST" key and "REFERENCE" key, in addition to those generally used in ECR's.

Figure 4:
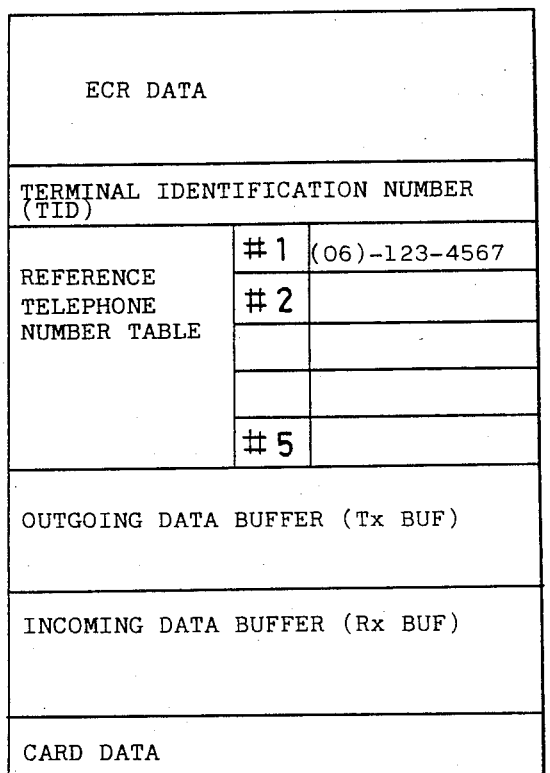
FIG. 4 shows the contents of a memory included in the ECR.

FIG. 4 shows the arrangement of data in the memory 12 of the ECR 4. The memory 12 has an area for storing data for cash registration processing (ECR data), an area for storing the number for identifying the ECR (terminal identification number or TID), an area providing a table of reference telephone numbers, areas for use as outgoing and incoming data buffers, an area for storing card data, etc. The telephone number table stores the telephone numbers of centers specified by the shortened dial numbers #1 to #5 in corresponding relation thereto.

The telephone number of a center is registered, for example, by a key input sequence following the setting of the mode switch 41 to "PROGRAM". FIG. 4 shows an example wherein the telephone number 06-123-4567 of a certain center is registered as the shortened dial number #1. First, the function key "MENU", numerical key "1" and function key "CASH/TOTAL" are depressed in the order mentioned to select a reference telephone number registration menu. Next, the function key "DIAL" is depressed, and then the center specifying key "#1" is depressed to select the shortened dial number #1. Finally, the numerical keys "0", "6", "1", "2", "3", "4", "5", "6", "7" and function key "CASH/TOTAL" are depressed in the order mentioned, whereby the number is registered.

The reference telephone number table can be such that the telephone numbers of the centers are stored in corresponding relation to the numbers identifying the centers, such as the codes of the credit companies or banks. Since the card data includes the code of a credit company or bank, the center concerned can be automatically dialed with reference to the card data in this case, without the necessity of entering the shortened dial number with use of a key 42.

FIG. 5 shows an example of CIF 21 at the center 2 of the credit company. The CIF 21 has stored therein details of information as to the individual members of the company under the corresponding members' numbers. The information includes credit limits. FIG. 6 shows an example of trouble file 22 at the center 2. The trouble file 22 is adapted to store data as to the credit cards which have been invalidated. The data includes the reason for the invalidation of each of such cards under the member's number concerned.

The CIF and trouble file 31 at the center 3 of the bank are similar to those described above, except that the account number will be used as a customer identifying code instead of the member's number. The deposit balance of the customer, etc. are also stored in the CIF. The limit on credit to be afforded can be determined according to the sums of deposits in time and ordinary deposit accounts, etc.

Figure 7:
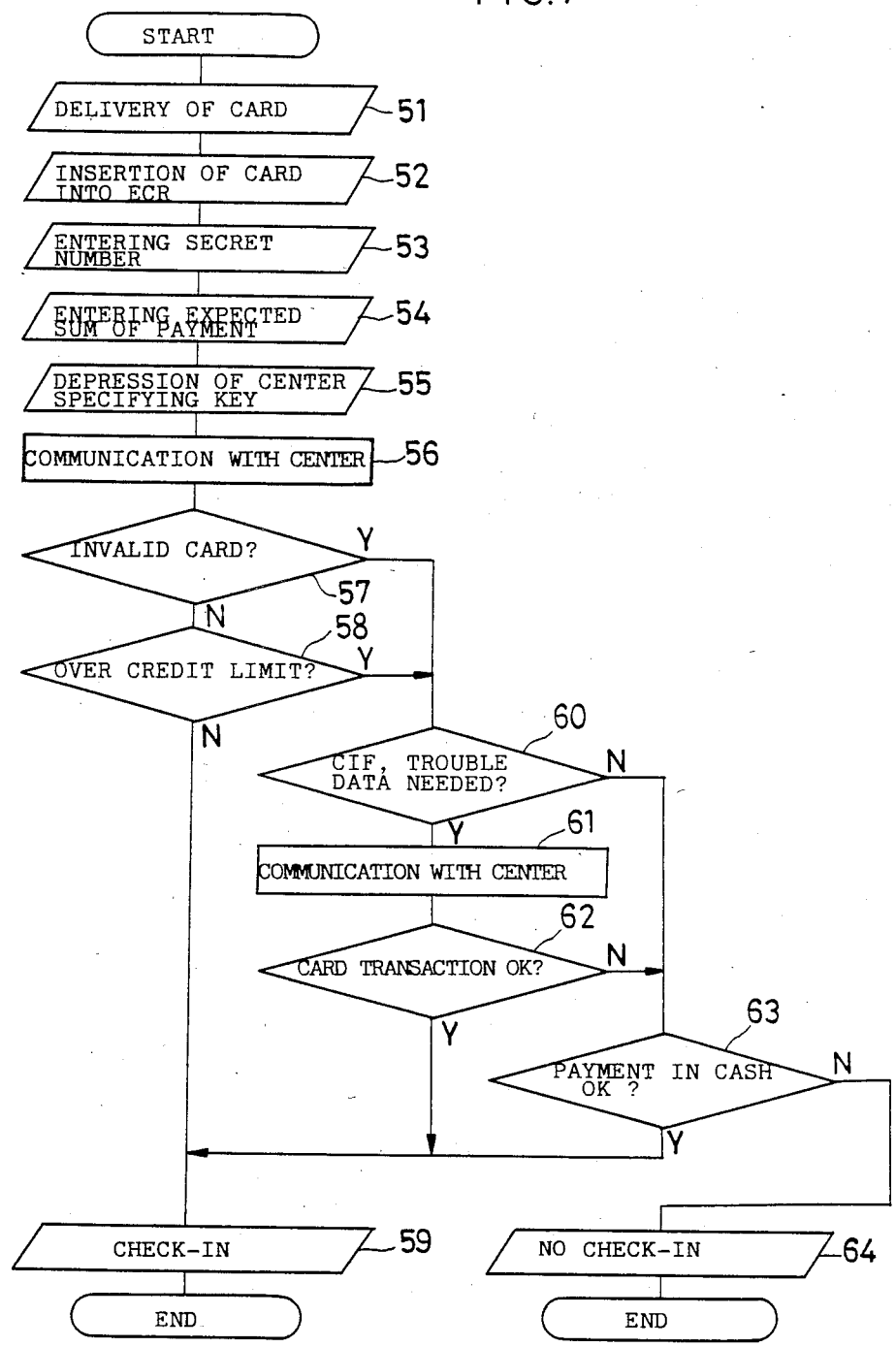
FIG. 7 is a flow chart showing the procedure to be followed at the front of a hotel.

FIG. 7 shows the procedure of credit inquiry to be executed when the ECR 4 is installed on the front desk of a hotel. In the case illustrated, the ECR communicates with the center of a credit company.

First, the guest delivers his credit card to the front clerk (step 51). The credit card is inserted into the card reader 13 of the ECR 4 by the clerk (step 52), so that the data recorded in the card is read by the card reader 13 and stored in the card data area of the memory 12.

When required, the secret number is entered by the guest with use of the keyboard 17 (step 53) and checked with reference to the secret number read from the card. When one number matches the other, next step follows, whereas if they are not in match, the display 14 shows the result, and no further steps are performed. The center may have the secret number stored in its CIF, and the secret number keyed in or read from the card may be transmitted to the center, where the two numbers will be compared for matching.

The expected amount of payment corresponding to the accommodation charge is keyed in by the front clerk with the keyboard 15 (step 54). The amount of payment is also stored in the memory 12. The credit card indicates the credit company concerned, and when one of the keys 42 is depressed to specify that credit company (step 55), the corresponding telephone number is read out from the telephone number table in the memory 12. The communication control unit 18 automatically dials the corresponding center to connect the telephone line. Alternatively the clerk may manually dial the center with numerical keys 43. Further alternatively the telephone number of the credit company may be retrieved from the table with reference to the code of the company in the card data for automatic dialing as already stated. In this case, the function key "REFERENCE" will be used for giving an instruction for starting automatic dialing.

When the ECR 4 is connected to the center to be referred to, a message edited in the outgoing data buffer of the memory 12 and containing the terminal identification number (TID), card data and amount of payment is sent to the center.

At the center 2, the trouble file 22 is searched with reference to the member's number in the card data sent from the ECR 4 to check whether the member's number is registered in the file 22. If the number is not registered in the trouble file 22, the CIF 21 is searched, and the amount of payment forwarded is compared with the credit limit set for the member concerned. A message is then sent from the center 2 to the ECR 4 concerned which message contains the check result as to whether the card is invalid and whether the amount of payment is in excess of the credit limit. The message is stored in the incoming data buffer of the memory 12.

The data in the incoming data buffer is shown on the display 14 and/or is printed by the printer 16. The display or print tells the clerk whether the card is invalid (step 57) and whether the amount of payment is in excess of the credit limit (step 58). A further step is therefore taken according to the result. More specifically, if the card is not invalid, with the sum of payment not in excess of the credit limit, it is judged that the payment can be made with the credit card, allowing the guest to check in (step 59).

However, even if the card is invalid or the sum of payment is in excess of the credit limit, the present embodiment is so adapted that the clerk can check the guest for his credit standing with reference to the details of personal data of the guest which will be sent from the center (step 60). In this case, the clerk depresses the function key "CIF REQUEST" on the keyboard 15, whereupon the ECR 4 is connected to the center 2 again, and a message requesting detailed personal data is sent from the ECR 4 to the center 2.

Upon receipt of the message, the center 2 searches the CIF 21 to edit a message covering all or part of personal data of the member concerned and sends the message to the ECR 4 (step 61). This communication is of course carried out in the same manner as in step 56.

The personal data forwarded from the center is shown on the display 14. The clerk can judge whether the transaction with the card is acceptable, generally with reference to the display, especially such items of personal data as the date of application for membership, the member's name, the member's employer, the period of residence of the member at the present address (code), the member's married/unmarried code, the member's annual income (classification code), the member's financial standing (code which may indicate dishonest practice, if any), the name of membership family, etc. (Step 62.) When the transaction is found acceptable, a check-in procedure follows (step 59).

If the transaction is found unacceptable, the clerk asks the guest whether he agrees to make the payment in cash (step 63). If he agrees, check-in follows, but if otherwise, he is of course unable to check in (step 64).

In the case where the report from the center 2 indicates that the card is invalid or that the sum of payment is in excess of the credit limit, the front clerk can of course proceed to the step of checking whether the guest agrees to a cash transaction, without making reference to the detailed personal data at the center 2.

Although the foregoing description is given of the case wherein the ECR communicates with the center of a credit company, the communication between the ECR and a bank is of course made in the same manner as above.

What is claimed is:

1. An electronic cash register comprising:
   a keyboard having keys for cash registration and for initiating customer credit inquiries,
   means for performing cash registration processing,
   a card reader for reading data recorded in a customer card,
   a communication control unit for communicating with a center provided with a customer file having stored therein at least data relating to the credit standing of a plurality of customers,
   a device for converting data relating to the credit standing of a selected customer sent from the center to visible information,
   a memory for storing data as to cash registration and data as to credit inquiries, and
   a control unit responsive to keyboard entries for processing cash registration, controlling transmission of the data read from the card to the center in a credit inquiry message for a selected customer in response to a communication start instruction, and controlling conversion of credit standing data for a selected customer received from the center to visible information.

2. An electronic cash register as defined in claim 1 wherein the keyboard has a key for giving the communication start instruction.

3. An electronic cash register as defined in claim 1 wherein the keyboard has a key for specifying the center with which the register communicates.

4. An electronic cash register as defined in claim 1 wherein the card is a credit card, and the center is a credit company center.

5. An electronic cash register as defined in claim 1 wherein the card is a bank card, and the center is a bank center.

6. An electronic cash register as defined in claim 1 wherein the data relating the credit standing of the customer includes data as to whether the card is an invalid card, data as to a credit limit and personal data as to the customer.

7. An electronic cash register as defined in claim 1 wherein the keyboard has a key for making inquiries as to whether the card is an invalid card.

8. An electronic cash register as defined in claim 1 wherein the keyboard has a key for making inquiries as to data relating to credit limits.

9. An electronic cash register as defined in claim 1 wherein the keyboard has a key for making inquiries as to personal data of the customer.

10. An electronic cash register as defined in claim 1 which is installed in an accommodation facility.

11. A system for performing credit transactions comprising an electronic cash register and a center, the electronic cash register comprising
    a keyboard having keys for cash registration,
    means for performing cash registration processing,
    a card reader for reading data recorded in a card,
    a communication control unit for communicating with the center,
    a device for converting data relating to the credit standing of a selected customer sent from the center to visible information, and
    a unit for controlling transmission of the data read from the card to the center in response to a communication start instruction and controlling conversion of the data from the center to visible information, the center comprising
    a communication control unit for communicating with the electronic cash register,
    a customer file having stored therein customer information and including data as to the credit standing of a plurality of customers, and
    a unit for searching the customer file in accordance with the data received from the electronic cash register, including data relating to a selected customer, and for controlling transmission to the register of the data relating to the credit standing of a selected customer.

12. A system as defined in claim 11 wherein the electronic cash register is provided with a keyboard including a key for entering the communication start instruction.

13. A system as defined in claim 11 wherein the customer file includes a trouble file storing data as to invalidated cards.

* * * * *